INVENTORS:
G. R. Baker
H. O. King
By: Marks & Clerk
Attys.

Patented May 23, 1933

1,910,785

UNITED STATES PATENT OFFICE

GEORGE RALPH BAKER, OF WILLESDEN, LONDON, AND HAROLD OLPIN KING, OF ELTHAM, LONDON, ENGLAND

BISCUIT AND LIKE FEEDING DEVICE

Application filed April 23, 1932. Serial No. 607,198.

This invention relates to machines or devices for feeding biscuits or crackers or articles of like disc or plaque form (hereinafter referred to as "biscuits") to a conveying surface or conveyor. The invention more particularly relates to means for discharging the biscuits arranged in a single file on edge in close order, transversely to the direction of movement, onto a conveying surface or endless conveyor so that they lie flat on the conveyor one behind the other in single file, either close together or in spaced relationship, such as is required, for example, for passing biscuits to a chocolate enrobing machine or device for coating the base of the biscuits.

The object of the invention is to provide a convenient and efficient machine or device facilitating the hand feeding of biscuits in batches thereto and to provide means whereby the fed biscuits automatically stack or arrange themselves in close order on edge whilst they are being automatically fed forward to a discharge position from which they are led or delivered one by one to lie in single file (or files) flat upon a conveyor with their faces uppermost in close order or in any desired spacing relationship.

An aim of the invention is to secure accurate discharge of the biscuits from the stacked file (or files) so that overlapping or lateral displacement of the biscuits is avoided.

Another aim of the invention is to provide facilities for enabling the machine to deal with biscuits of different widths.

The invention consists in the combination of a concave or double inclined conveyor situated at the bottom of biscuit troughs formed by laterally displaceable partitions with a discharge plate or slideway down which the biscuits, on reaching the end of their uphill travel on the conveyor, slide or fall onto a receiving conveyor vertically spaced below the delivery end of the concave conveyor, so that each biscuit on reaching the discharge point or edge of the latter conveyor abruptly leaves the conveyor edge and has time to fall clear away from the following biscuit before the latter in turn leaves the concave or double inclined conveyor. The partitions may extend over the discharge plate so that the parallel file formation of the biscuits will be maintained.

A feature of the invention lies in the provision of clamping means carried by each of the biscuit partitions adapted to engage in any position upon a transverse bar or member (or plurality thereof) common to all partitions. The concave or double inclined conveyor or the receiving conveyor (or both) is provided with variable speed gear driving means in order that the rate of travel of the biscuits may be varied and in order that the rate of travel of the conveyors relatively to one another may be altered for adjusting the spacing interval of the biscuits as discharged upon the receiving conveyor.

A further feature of the invention consists in pivotally mounting the lateral series or bank of partitions at one end thereof and in providing means for raising the other end to facilitate lateral adjustment of the partitions and the insertion or removal of the partitions from the bank.

In the accompanying drawings:—

Figure 5 is a diagram illustrating the improved method of delivering biscuits according to the invention.

In carrying the invention into effect according to one convenient mode, by way of example, a biscuit feeding or discharge conveyor is provided, the upper run 10a of which travels into contact with the lower edges of a plurality of spaced guides or partitions 11 which form a plurality of partitioned ways or troughs along which the biscuits are adapted to be fed in stacked condition on edge.

Figure 1:
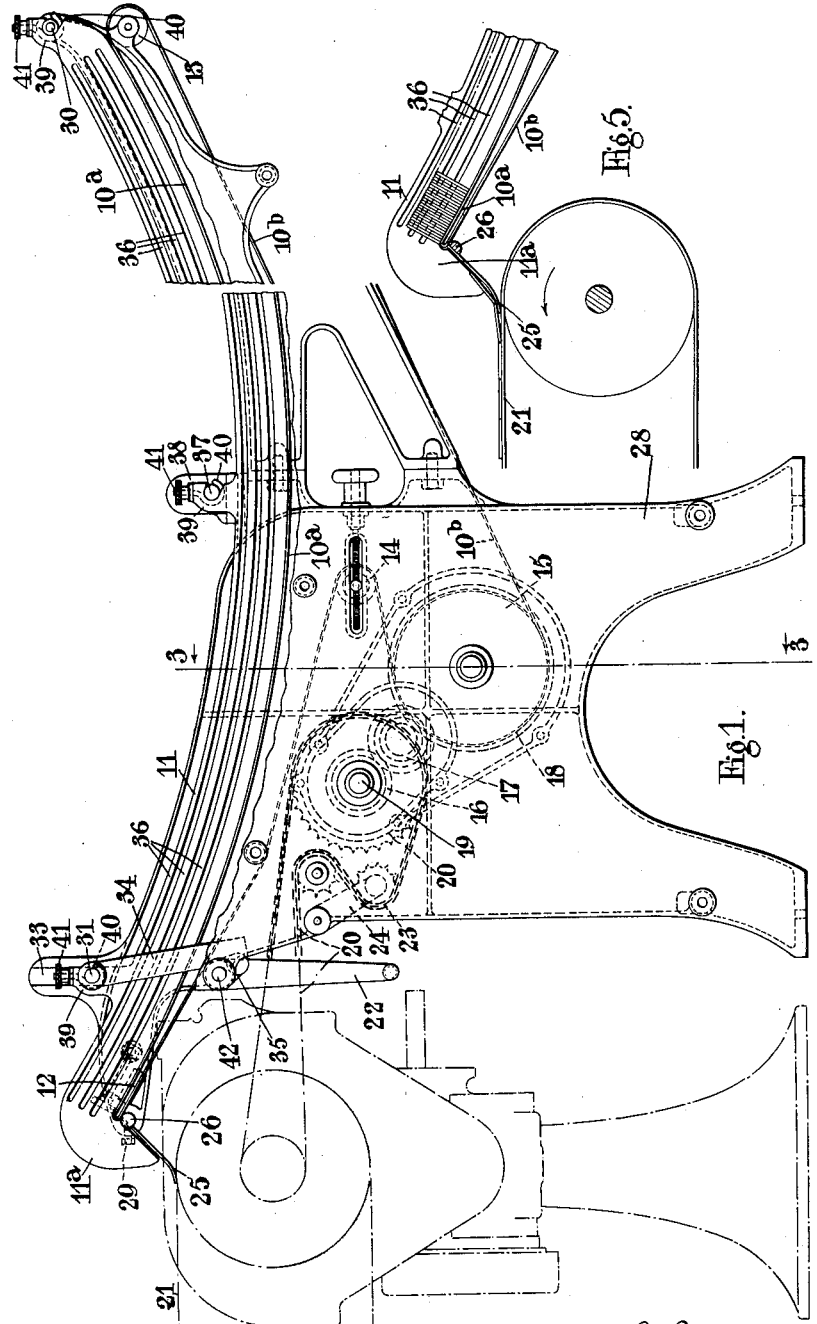
Figure 1 is a side view of a biscuit feeding machine according to the invention and indicating in dot and dash line the machine to which biscuits are to be delivered.
Figure 2:
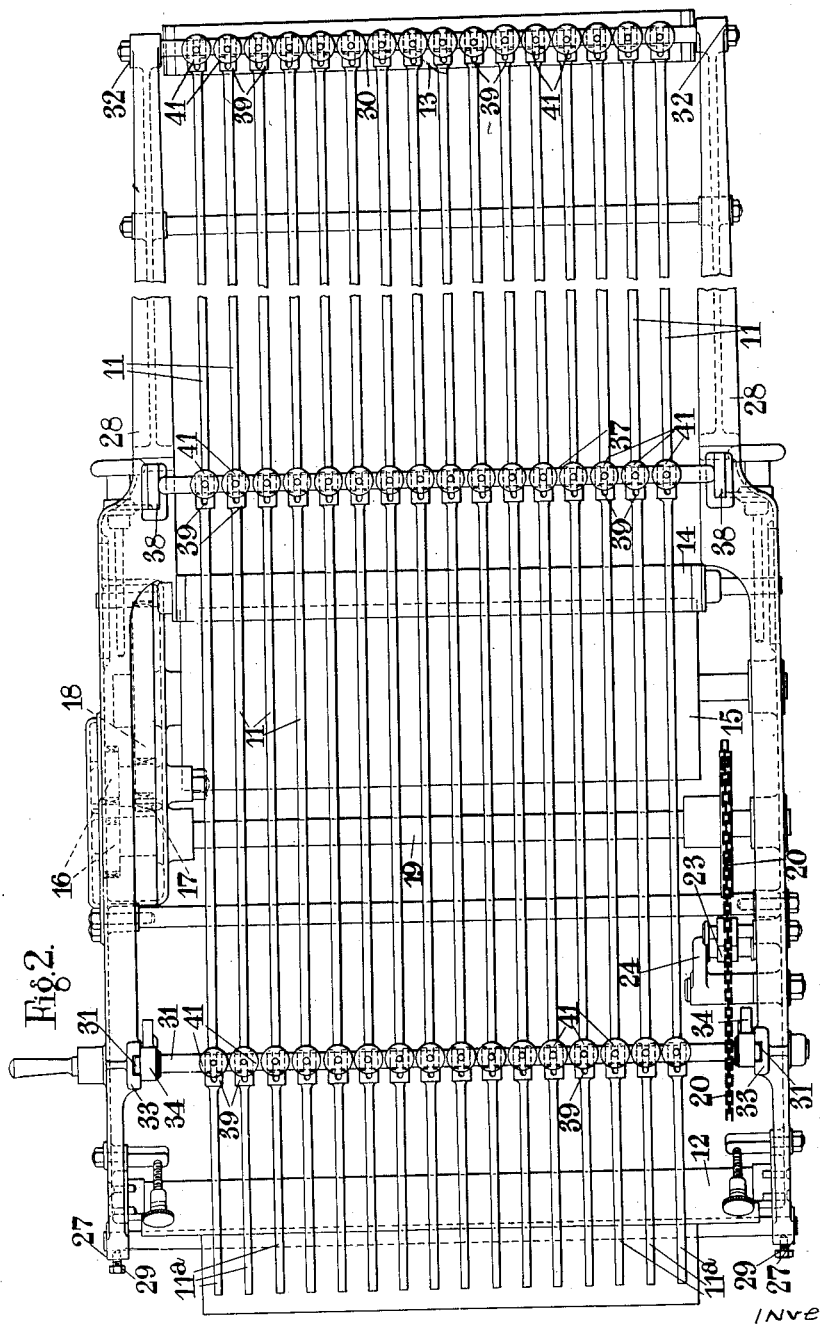
Figure 2 is a plan of the biscuit feeding machine.
Figure 3:
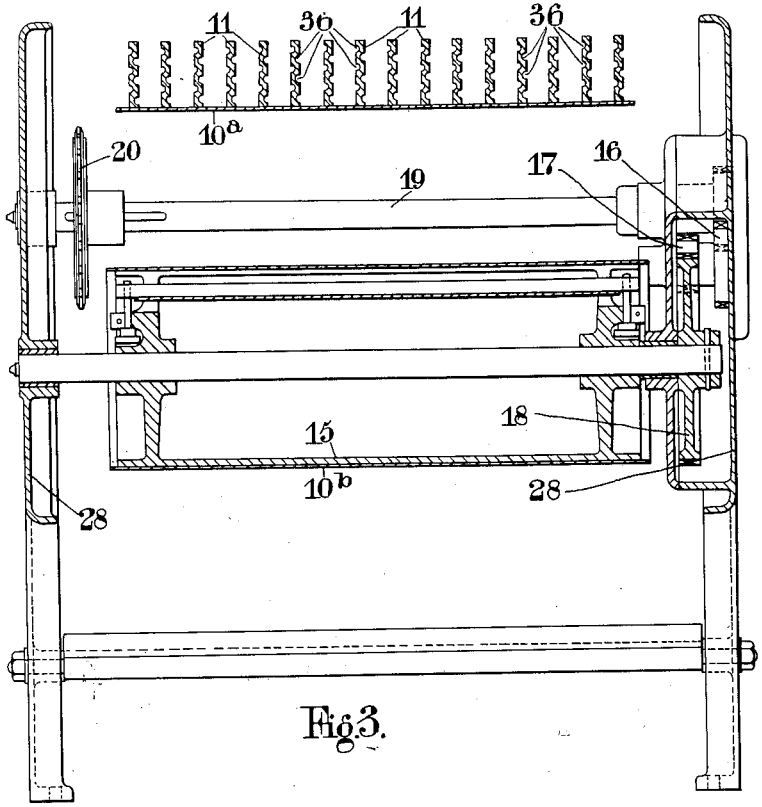
Figure 3 is a sectional elevation on the line 3—3 of Figure 1.
Figure 4:
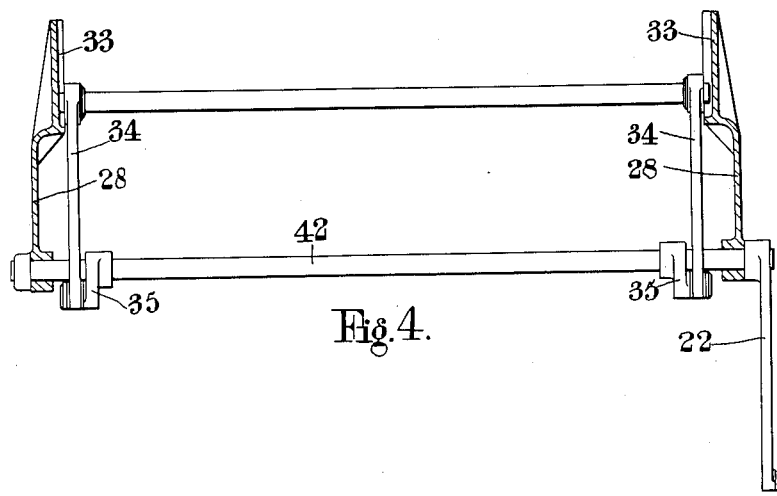
Figure 4 is an end elevation of the partition raising means.

The partitions 11 are curved as shown in Figure 1, whereby the biscuits will mutually support one another as they travel along the partitioned ways, into which they are fed by hand, those going uphill leaning towards and mutually supporting those coming downhill.

The feeding conveyor passes over a blade support 12 at the discharge end and over a guide roll 13 at the rear end, while the lower run 10b passes over a tensioning roll 14 and a driving roll 15, mounted in suitable bearings in the frames 28 of the machine.

The driving roll 15 may be driven by any suitable means and as shown is driven through a change gear 16 by the spur gears 17 and 18. The shaft 19 of the change gear 16 is driven by the chain and sprocket 20 from the conveyor 21 of the machine to which the biscuits are to be delivered for coating purposes. The chain 20 passes over a tensioning sprocket 23 carried by an adjustable lever 24. The relative speeds of the feeding conveyor and the delivery conveyor may be adjusted by altering the gear ratio of the change gear 16.

At the discharge end of the feeding conveyor 10a, 10b, a discharge plate or slideway 25 is provided which is mounted on a bar 26 carried in bearings 27 of the side frames 28. The bar 26 may be rotated to adjust the angle of the plate 25 and is locked in position by locking screws 29.

The discharge plate is adapted to receive the biscuits one by one as they are delivered over the blade support by the conveyor 10a, and deliver them to the conveyor 21. The lower edge of the plate is curved so that it merges into the plane of the conveyor 21.

The partitions 11 extend over the discharge plate as shown at 11a so that the files of biscuits as they slide down the discharge plate are maintained separate from one another, whereby they are delivered to the conveyor 21 in an orderly formation.

The partitions 11 are adjustably mounted upon bars 30, 31 at or adjacent the ends thereof, the bar 30 being carried in bearings 32 in the side frames 28. The bar 31 at its ends is mounted in slotted guides 33 in the frames 28 and is supported by links 34 which are connected at their lower ends to crank arms 35 adapted to be rotated or oscillated through the shaft 42 by a hand lever 22. By these means the partitions 11 as a unit may be pivoted about the bar 30 to lift them from the run 10a of the feeding conveyor, whereby lateral adjustments of the partitions and the insertion or removal of the partitions is facilitated.

The partitions are provided with longitudinally extending grooves 36 for reducing their weight while maintaining a suitable thickness and strength to avoid bending.

A partition spacing bar 37 is provided between the bars 30, 31, such bar lying between projecting guide surfaces 38 on the side frames 28. This spacing bar is adapted to maintain the correct spacing between the adjacent partitions at or about their mid points.

For the purpose of permitting lateral adjustment of the partitions 11 to take various sizes of biscuit, the partitions are provided with projections 39 in the nature of hooks which hook onto the various bars 30, 31 and 37. These projections are slotted to accommodate screw hooks 40 which also hook onto the bars 30, 31 and 37 but in an opposite sense to the hook projections. The screw hooks 40 are provided with milled nuts 41 and it will be appreciated that by screwing up a nut the bar will be gripped between the hook projections of the partition and the screw hook. By slacking back the nuts the partitions may be moved laterally along the bars, while by removing the screw hooks, the partitions may be removed from the bars by a longitudinal movement relatively thereto. When it is desired to adjust the lateral position of the partitions or to remove or add a partition to the series, the bar 31 is raised by the operation of the lever so as to lift the partition out of contact with the conveyor 10a.

In operation, referring to Figure 5, the biscuits are fed into the various troughs in batches or otherwise, so that they rest on the conveyor 10a on edge and mutually support one another owing to the shape of the conveyor path. The biscuits are fed to the left, as shown in Figure 1, to the discharge point where each biscuit abruptly leaves the edge of the conveyor and moves in a transverse path down the slideway 25 falling clear away from the following biscuit before the latter in turn leaves the delivery conveyor.

The biscuits as they fall down the slideway engage the receiving conveyor 21 and are carried away thereon to the coating machine. The biscuits on the receiving conveyor may be in close formation or spaced apart as may be required by suitably adjusting the relative speeds of the two conveyors.

Having now described our invention, what we claim as new and desire to secure by Letters Patent is:—

1. A biscuit feeding machine comprising, in combination, a double inclined conveyor situated at the bottom of a trough formed by laterally displaceable partitions, and a discharge plate at the discharge end of the conveyor for guiding biscuits onto a receiving surface spaced vertically below the conveyor.

2. A biscuit feeding machine comprising in combination a double inclined conveyor situated at the bottom of a trough formed by laterally displaceable partitions and a discharge plate at the discharge end of the conveyor for guiding biscuits onto a receiving conveyor spaced vertically below the conveyor, said partitions extending over the discharge plate to form partitioned ways across the plate.

3. A biscuit feeding machine comprising a series of laterally spaced partitions each having a longitudinally convex lower edge, an endless conveyor band, the forward run of which contacts with the lower edges of the partitions to form biscuit troughs therewith, means for clamping the partitions in their spaced relation, comprising abutments on the partitions, a bar common to all the partitions engaging said abutments, and means carried by each partition for clamping the bar against the abutment.

4. A biscuit feeding machine as claimed in claim 3, wherein the clamping means comprises oppositely acting hook elements carried by each partition and a tightening nut for gripping the bar between said hook elements.

5. A biscuit feeding machine comprising in combination a double inclined conveyor situated at the bottom of a trough formed by laterally displaceable partitions, and an inclined discharge plate at the discharge end of the conveyor for transferring biscuits onto a receiving conveyor and means including a change speed gear for driving the double inclined conveyor from the receiving conveyor.

6. A biscuit feeding machine comprising a double inclined conveyor band, a series of laterally spaced partitions mounted about said conveyor to form a plurality of biscuit troughs, a transverse bar to which the partitions at one end are connected, and means for raising the other ends of the partitions by a pivotal movement about the axis of said bar.

7. A biscuit feeding machine as claimed in claim 3, wherein said means comprises a transverse spacing bar to which the partitions are clamped, a rock shaft located beneath the partitions, crank arms on the shaft, links coupling the crank arms with the spacing bar and a lever for oscillating the rock shaft.

8. A biscuit feeding device comprising an endless conveyor having a feeding run extending over a concave path and below a series of laterally spaced partitions forming troughs along which biscuits are adapted to be fed on edge to a discharge point, means for receiving the biscuits at the discharge point and transferring them flat upon a receiving conveyor located below the level of the discharge point.

9. A biscuit feeding machine comprising a plurality of laterally spaced partitions having longitudinally convex edges, said partitions being corrugated in cross section, an endless conveyor band, the feeding run of which is located below said convex edges and forms biscuit troughs along which biscuits are adapted to be fed on edge to a discharge point, a blade support over which the conveyor moves, located at the discharge point, a plate located adjacent the discharge point of the conveyor and extending below the conveyor for receiving the biscuits as they are delivered over the discharge point and delivering them flat upon a receiving conveyor.

10. A biscuit feeding machine comprising in combination a double inclined conveyor situated at the bottom of a trough formed by spaced partitions and a guideway at the discharge end of the conveyor for receiving biscuits and delivering them flat upon a receiving surface.

In testimony whereof we have signed our names to this specification.

GEORGE RALPH BAKER.
HAROLD OLPIN KING.